United States Patent [19]

Fernsler

[11] 4,134,082

[45] Jan. 9, 1979

[54] RAMP GENERATOR FOR HARMONIC TUNED DEFLECTION

[75] Inventor: Ronald E. Fernsler, Indianapolis, Ind.

[73] Assignee: RCA Corporation, New York, N.Y.

[21] Appl. No.: 864,837

[22] Filed: Dec. 27, 1977

[51] Int. Cl.² .......................... H03B 3/04; H04N 5/04
[52] U.S. Cl. ...................................... 331/20; 331/25; 358/159
[58] Field of Search ............... 331/20, 18.25; 358/158, 358/159

[56] References Cited

U.S. PATENT DOCUMENTS

| 2,912,651 | 11/1959 | Leeds | 331/20 X |
| 3,764,744 | 10/1973 | Van Hattum et al. | 358/159 |

OTHER PUBLICATIONS

RCA Television Service Data File 1975 C-10, Figure 21. CTC 74K Deflection and Power Supply Schematic.

Primary Examiner—Siegfried H. Grimm
Attorney, Agent, or Firm—Eugene M. Whitacre; Paul J. Rasmussen; William H. Meise

[57] ABSTRACT

A horizontal oscillator phase-lock loop arrangement compares synchronizing pulses with recurrent ramp signals derived from the horizontal retrace pulses to control the deflection frequency. The ramp signals are generated by a capacitor charged during the retrace interval through a diode from a reference voltage established by a clamp.

9 Claims, 2 Drawing Figures

RAMP GENERATOR FOR HARMONIC TUNED DEFLECTION

This invention relates to television oscillator frequency control circuits and more particularly to arrangements for generating from retrace pulses a reference ramp for a phase detector.

Television receivers display video information on a raster which is scanned horizontally at a first rate, and scanned vertically at a second, generally slower rate. The television video information comprises amplitude-modulated synchronizing pulses by which the raster scanning is synchronized with the information to be viewed. It is customary to provide immunity against incidental noise which may occur between the source of video information and the television receiver by synchronizing the horizontal-rate deflection with the horizontal-rate synchronizing pulses in an indirect manner. One such indirect manner is the phase-lock loop, in which a phase detector has horizontal rate synchronizing pulses applied to one input, and ramp signals related to the horizontal deflection applied to the other input. The phase detector responds to these inputs and produces control pulses, which are filtered and used to control a horizontal-rate oscillator at a frequency which is an average of the incoming synchronizing signals. The horizontal oscillator in turn drives a horizontal deflection generator which produces recurrent retrace pulses which are integrated to produce the recurrent ramp or sawtooth signal input to the phase detector.

The horizontal deflection current generator is ordinarily used to produce the ultor high voltage for energizing a kinescope display device. This is accomplished by a step-up transformer which transforms the retrace pulses to a high potential, which is rectified to produce the direct ultor potential. In order to decrease the effective source impedance of the ultor voltage generator, the interval during which the ultor receives charging current from the rectifier is increased by tuning the step-up or flyback transformer to an odd harmonic of the retrace frequency. This has the effect of indenting the top of the retrace voltage pulse, producing an irregular pulse waveform.

When integrated, the indented pulse produces a sawtooth voltage having a non-linear change with time. Further, changes in the beam current of the kinescope resulting from changes in the video being displayed affect the loading on the flyback transformer and may cause further changes in the shape of the retrace voltage pulse. This may cause changes in the rate of rise of the ramp portion of the sawtooth which is used as one input to the phase detector. Such nonlinearities adversely affect the operation of the horizontal oscillator control by the phase-lock loop.

It is known to charge a capacitor with current from a source of operating potential during the horizontal scanning interval. A transistor coupled across the capacitor and rendered conductive by the retrace pulse creates a ramp during the capacitor discharge which can be used for oscillator control. Such a circuit is described in RCA Television Service Data File 1975 C-10 for the CTC 74 series chassis. While this circuit is stable, the transistor is relatively expensive and remains subject to variations in the retrace pulse base drive.

SUMMARY OF THE INVENTION

A television deflection oscillator synchronization arrangement includes a horizontal deflection current generator which promotes the flow of deflection current at a controllable deflection rate during recurrent scanning intervals, and generates voltage pulses during recurrent retrace intervals. A clamp is coupled to a source of reference voltage and to the deflection current generator for generating a reference charging voltage during the retrace intervals. A capacitor is coupled to the clamp and is charged during the retrace interval from the reference charging voltage through a rectifier to produce recurrent ramp signals. A phase detector has a first input coupled to a source of synchronizing signals and a second input coupled to the capacitor, and produces a control signal in response to the difference in phase and frequency between the recurrent ramp and the synchronizing signals. The control signal is coupled to the horizontal deflection current generator.

DESCRIPTION OF THE INVENTION

Figure 1:
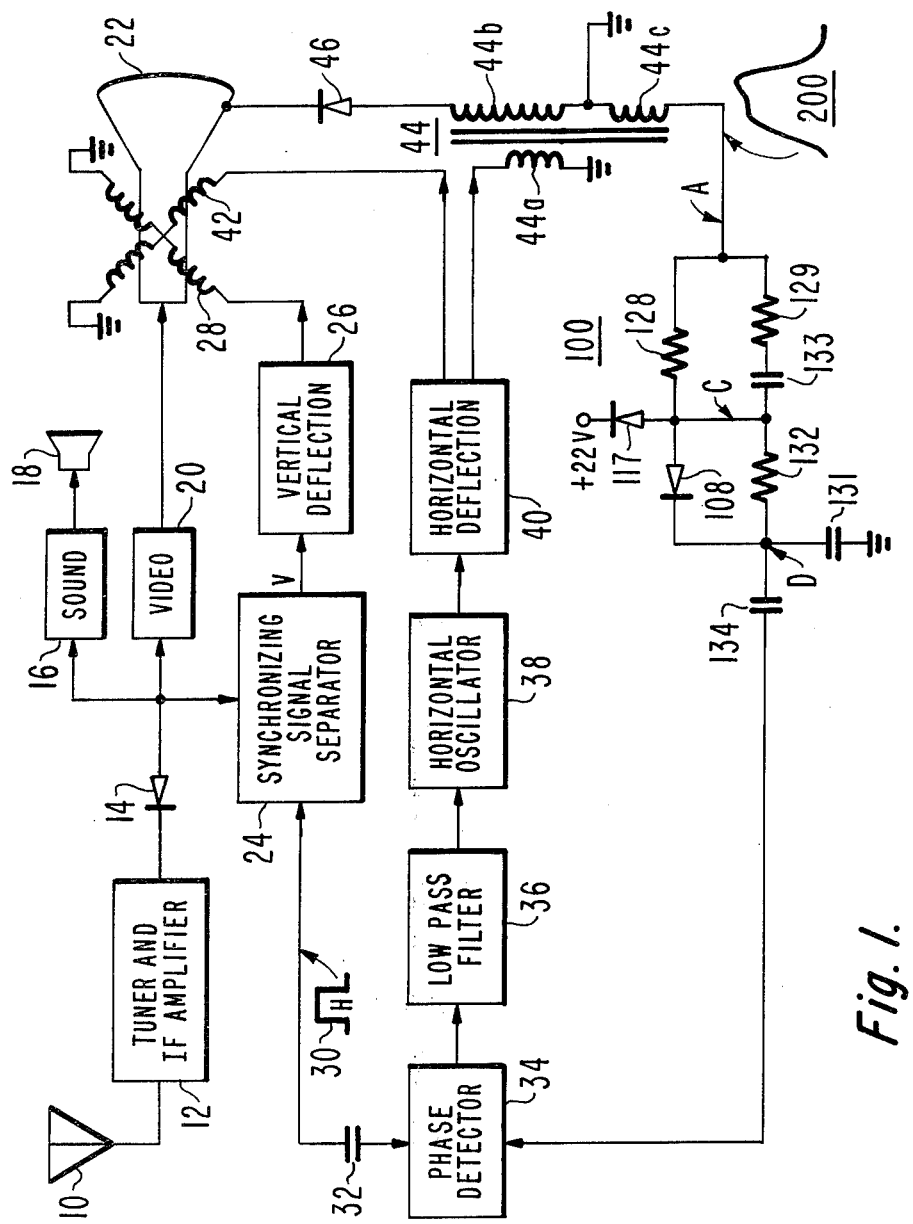
FIG. 1 is a drawing, partially in block and partially in schematic form, of a television receiver embodying the invention.

In FIG. 1, a television receiver includes an antenna 10 which receives broadcast signals and couples them to a tuner, mixer and IF amplifier illustrated as block 12, which selects a particular channel and converts the signals at that channel to a standard intermediate (IF) frequency. The IF signals are applied to a detector represented as a diode 14, which produces composite video signals and an intercarrier sound signal. The intercarrier sound signal is selected, detected and amplified by a sound channel illustrated as block 16, and the resulting audio signals are applied to a loudspeaker 18. The information portion of the composite video produced by detector 14 is selected and amplified by circuits illustrated as block 20, and is applied to control electrodes of a kinescope 22 for a display. Vertical synchronizing signals are extracted from the composite video by a synchronizing signal separator circuit illustrated as block 24, and are applied to a vertical deflection circuit for synchronizing the flow of deflection current through a vertical deflection winding illustrated as 28 associated with kinescope 22.

Synchronizing signal separator 24 also extracts horizontal synchronizing signals illustrated as waveform 30 from the composite video, and applies them through a capacitor 32 to a first input of a phase detector 34. A second input of phase detector 34 receives sawtooth signals related to the horizontal deflection. Phase detector 34 produces control pulses which are applied to a lowpass filter 36, which limits the loop bandwidth. The filtered control signals are applied to a frequency control input of a horizontal oscillator 38, which produces drive pulses for horizontal deflection circuit 40.

Horizontal deflection generator 40 responds to the horizontal oscillator pulses to produce recurrent sawtooth scanning current in a horizontal deflection winding 42 associated with kinescope 22. During the horizontal retrace interval, horizontal deflection circuit 40 produces a large retrace voltage which aids in reversing the current in the deflection winding. The high retrace voltage is also applied to a primary winding 44a of a high voltage transformer designated generally as 44. A secondary winding 44b of transformer 44 has one end grounded and the other end coupled to a rectifier illustrated as a diode 46, the output of which is coupled to the ultor of kinescope 22. Another secondary winding 44c of transformer 44 has one end grounded and the other end coupled by a conductor A to a ramp generator designated generally as 100. Output terminal D of ramp generator 100 is coupled by a capacitor 134 to the second input of phase detector 34.

Ramp generator 100 includes a diode 117 the cathode of which is connected to a +22 volt reference voltage. The anode of diode 117 is coupled to conductor A by a resistor 128. The junction of diode 117 and resistor 128, designated C, is also coupled to conductor A by a phase-shifting network including a capacitor 133 and resistor 129.

Phase-shifting circuit 129, 133 forms in conjunction with resistor 132 a differentiator or lead network which compensates for the delay between the horizontal retrace pulse applied to primary winding 44a and the output pulse on secondary winding 44c resulting from transformer leakage inductance. This delay may be on the order of one-half microseconds.

A capacitor 131 has a first electrode grounded and a second electrode coupled to the cathode of a diode 108. The anode of diode 108 is coupled to point C. Diode 108 is paralleled by a resistor 132.

Figure 2:
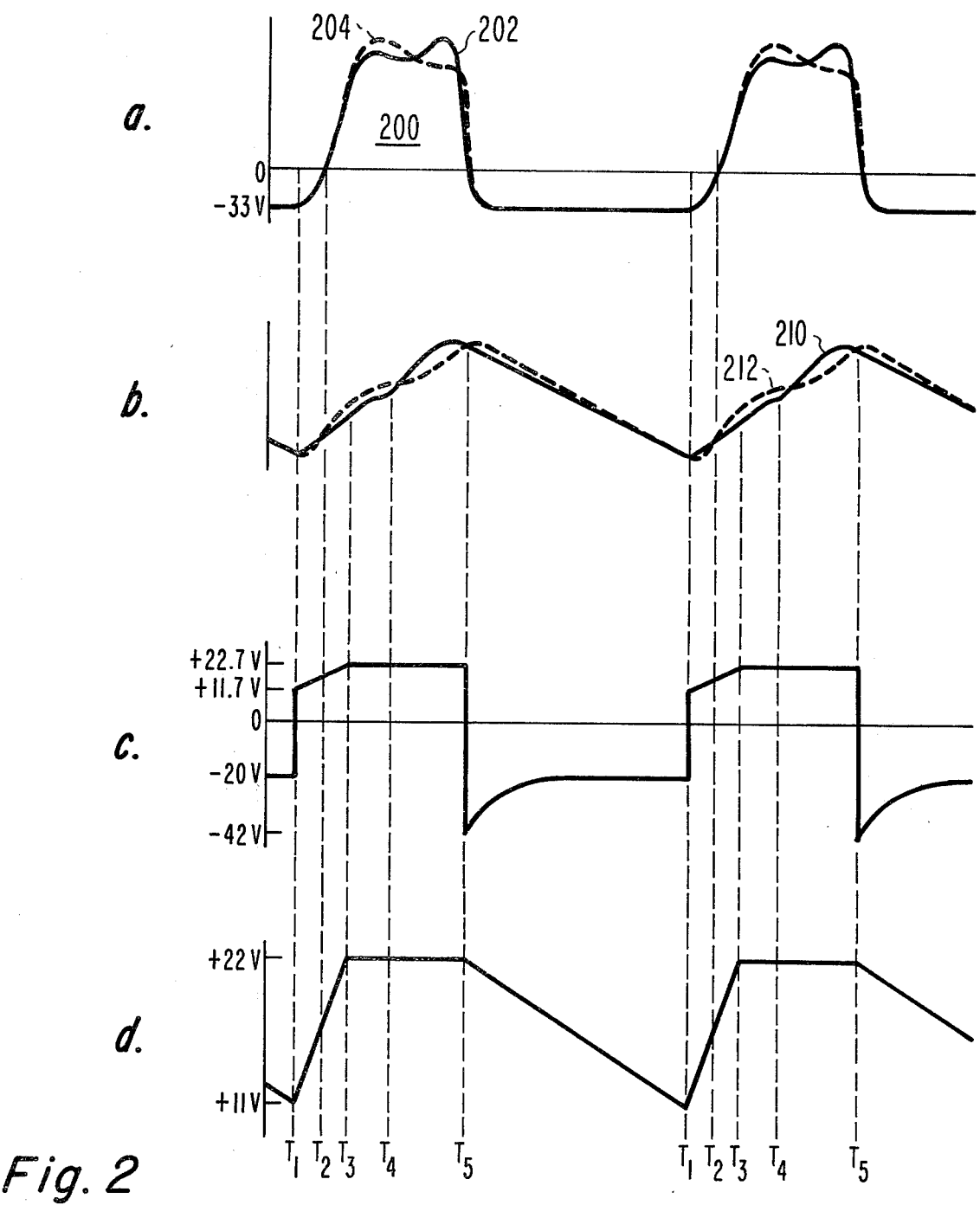
FIG. 2 illustrates voltage-time waveforms related to the arrangement of FIG. 1.

In operation, secondary winding 44c produces retrace pulses illustrated generally as 200. In FIG. 2a, waveform 202 illustrates one form which the retrace pulses may take when the transformer is tuned to the third harmonic of the retrace frequency. Dotted waveform 204 illustrates in an exaggerated manner the changes which may occur in the shape of the retrace pulse during heavy beam current loading.

Waveform 210 of FIG. 2b illustrates between times $T_1$ and $T_5$ the non-linear voltage-time relationship which may result from integration of the harmonically tuned pulses 200. Near time $T_4$, a point of inflection occurs. This point of inflection occurs near the center of the retrace interval, near the time at which phase detector 34 will sample ramp voltage 210 under the control of horizontal synchronizing pulse 30. Waveform 212 of FIG. 2b illustrates the type of change in the shape of the retrace pulse which can occur when kinescope beam current increases. It will readily be understood that such nonlinearities and changes in the ramp in the interval $T_1 - T_5$ will adversely affect control of the horizontal oscillator.

In operation, immediately prior to the beginning of the retrace interval $T_1 - T_5$, capacitor 131 is charged to approximately +11 volts, as shown in FIG. 2d, and is discharging through resistor 128 and 132 towards the negative potential at conductor A. The voltage at point C is approximately −20 volts, intermediate the voltage at output terminal D and that at conductor A. Diodes 108 and 117 are nonconductive.

At time $T_1$, the voltage on conductor A rises rapidly towards a high positive potential. The voltage at point C begins to rise, as shown in FIG. 2c. When the voltage at point C slightly exceeds 11 volts, diode 108 becomes conductive and capacitor 131 begins to charge in an approximately linear fashion towards the rising voltage at point C.

The voltage at point C and at output terminal D continue to rise until a time $T_3$ at which the voltage at point A slightly exceeds the reference 22 volts. At time $T_3$, diode 117 becomes conductive, forming with resistor 128 a clamp preventing further increase of either the voltage at point C or at point D. At this time, winding 44c supplies current to both capacitor 131 and the reference source. The voltage to which point C is clamped during the interval $T_3 - T_5$ will be 1 $V_{be}$ above the reference 22 volt level. The voltage to which output terminal D is clamped in this interval will be 1 $V_{be}$ below the voltage at point C, and will therefore be substantially equal to the reference voltage, independent of temperature. With point C clamped, phase-shifting capacitor 133 will tend to charge towards the high positive pulse voltage.

At time $T_5$, the retrace pulse ends and the voltage on conductor A decreases as shown in FIG. 2a. Diodes 108 and 117 become nonconductive, and the voltage at point C is driven sharply negative by the charge remaining on phase-shifting capacitor 133, as shown in FIG. 2c. At this time, capacitor 132 begins to discharge through resistors 128 and 131 towards the negative voltage on conductor A. During the trace interval between retrace pulses, capacitor 133 discharges quickly, and the voltage at point C assumes a constant value of about −20 volts.

The arrangement of FIG. 1 by virtue of the clamp and the charging of capacitor 131 through the diode produces a substantially linear ramp which is unaffected by tuning of the retrace pulse. The ramp is also unaffected by changes in the retrace pulse shape caused by kinescope beam loading or by other loads coupled to the horizontal output stage. This tends to stabilize the phase-lock loop and the horizontal oscillator, providing a more stable raster for the display of video information. The time interval during which the ramp is available for phase comparison differs slightly from that interval during which an integrated retrace pulse is available, but the difference is slight and will not ordinarily create an objectionable shift of the displayed video. This shift may be compensated if desired by delaying the separated horizontal synchronization pulses slightly.

Other embodiments of the invention will be apparent to those skilled in the art. For example, the phase-shifting network may be embodied as any known phase-lead network. Transistors or other unidirectional conducting devices may be substituted for diodes 117 and 108. Resistance 128 may be included as the winding resistance of secondary 44c. Also, the value of capacitor 134 may be adjusted to suit the input impedance of the phase detector, or in certain cases capacitor 134 may be eliminated altogether.

In a particular embodiment of the invention, in which the delay of the video transformer was approximately one-half microsecond, the following component values were found to give satisfactory operation:

| DIODES | |
|---|---|
| 108, 117 | HIGH SPEED SWITCHING DIODE |
| RESISTORS | OHMS |
| 128 | 36K |
| 129 | 4700 |
| 132 | 82K |
| CAPACITORS | pF |
| 131 | 2200 |
| 133 | 56 |
| 134 | 1000 |

What is claimed is:

1. A television deflection synchronization arrangement comprising:
   deflection current generator means for promoting the flow of deflection current at a controllable deflection rate during recurrent scanning intervals and for generating voltage pulses during recurrent retrace intervals;
   capacitance means;
   charging means comprising first and second serially coupled resistance means coupled to said deflection current generation means and to said capacitance means for providing a path for the flow of current therebetween for generating a recurrent ramp signal across said capacitance means in response to said voltage pulses, said charging means further comprising first unidirectional current conducting means coupled in parallel with said first resistance means;
   a source of synchronizing signals;
   phase detecting means coupled to said source of synchronizing signals and to said capacitance means for comparing said recurrent ramp signal with said synchronizing signals and for controlling said deflection rate in response to said synchronizing signals; and
   clamping means comprising a reference voltage source and second unidirectional current conducting means coupling said reference voltage source to the junction of said first and second serially coupled resistance means for limiting the voltage at a point on said charging means to a particular value less than the peak voltage of said voltage pulses.

2. A synchronization arrangement according to claim 1 wherein each of said first and second unidirectional current conducting means comprises a rectifier.

3. A synchronization arrangement according to claim 1 further comprising reactance means coupled with said second resistance means.

4. A synchronization arrangement according to claim 1 further comprising phase-shifting means coupled with said charging means.

5. A television deflection synchronization arrangement, comprising:
   horizontal deflection current generation means for promoting the flow of deflection current at a controllable deflection rate during recurrent scanning intervals and for generating voltage pulses during recurrent retrace intervals, said voltage pulses having an irregular waveform;
   a source of reference voltage;
   clamping means coupled to said deflection generation means and to said source of reference voltage for generating a reference charging voltage during said retrace intervals;
   capacitance means;
   means coupled to said capacitance means for discharging said capacitance means;
   unidirectional current conducting means serially coupled with said capacitance means thereby forming a series charging network;
   means coupling said series charging network to said clamping means and a point of reference potential for promoting charing of said capacitance means from said reference charging voltage through said unidirectional current conducting means during said retrace interval, thereby forming recurrent ramp signals at the deflection rate;
   a source of synchronizing signals;
   phase detecting means having a first input coupled to said source of synchronizing signals, a second input coupled to said series charging network and an output coupled to said controllable deflection means for comparing said recurrent ramp signals with said synchronizing signals and for controlling said deflection rate in response to said synchronizing signals.

6. A television arrangement according to claim 5 wherein said clamping means comprises phase-shifting means.

7. A television arrangement according to claim 5 wherein said clamping means comprises unidirectional current conducting means having a first terminal coupled to said source of reference voltage and having a second terminal, and resistance means coupled between said second terminal and said deflection generation means, whereby said reference charging voltage exceeds said reference voltage by the offset potential of said unidirectional current conducting device.

8. A television arrangement according to claim 7 wherein said unidirectional current conducting device is a diode and said offset voltage is a semiconductor junction potential.

9. A television arrangement according to claim 5 wherein said discharging means comprises resistance means coupled in parallel with said unidirectional current conducting device.

* * * * *

UNITED STATES PATENT AND TRADEMARK OFFICE
CERTIFICATE OF CORRECTION

PATENT NO. : 4,134,082

DATED : January 9, 1979

INVENTOR(S) : Ronald E. Fernsler

It is certified that error appears in the above-identified patent and that said Letters Patent is hereby corrected as shown below:

```
Column 4, line 20, that portion reading "132" should read
-- 131 --; line 21, that portion reading "131" should read
-- 132 --; Column 6, line 16, that portion reading "charing"
should read -- charging --.
```

Signed and Sealed this

Tenth Day of April 1979

[SEAL]

Attest:

RUTH C. MASON
Attesting Officer

DONALD W. BANNER
Commissioner of Patents and Trademarks